(12) United States Patent
Dobson et al.

(10) Patent No.: US 6,378,359 B1
(45) Date of Patent: Apr. 30, 2002

(54) METHOD AND SYSTEM FOR EVALUATING EXHAUST ON-BOARD DIAGNOSTICS SYSTEM

(75) Inventors: Douglas A. Dobson, Plymouth; Jeffrey Scott Hepburn, Birmingham; Michael Igor Kluzner, Oak Park; Robert Joseph Jerger, Dexter; Timothy Chanko, Canton, all of MI (US); William Lewis Henderson Watkins, Toledo, OH (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/479,534

(22) Filed: Jan. 7, 2000

(51) Int. Cl.[7] ............................ G01M 19/00; F01N 3/00
(52) U.S. Cl. ........................................ 73/118.1; 60/277
(58) Field of Search ................................ 73/116, 118.1; 60/274, 277

(56) References Cited

U.S. PATENT DOCUMENTS

| 4,691,562 | A | | 9/1987 | Abthoff et al. | |
| 4,878,380 | A | | 11/1989 | Goodman | |
| 5,077,970 | A | | 1/1992 | Hamburg | |
| 5,396,794 | A | | 3/1995 | Nichols | |
| 5,964,089 | A | * | 10/1999 | Murphy et al. | 60/274 |
| 5,998,210 | A | * | 12/1999 | Hepburn et al. | 60/276 |

\* cited by examiner

*Primary Examiner*—Benjamin R. Fuller
*Assistant Examiner*—Maurice Stevens
(74) *Attorney, Agent, or Firm*—Jerome R. Drouillard

(57) ABSTRACT

A system and method of normalizing an emissions threshold catalytic brick 302 without a mileage accumulation step is used to evaluate an on-board diagnostics for an exhaust system. The method comprises normalizing a emissions threshold catalytic brick 302 by placing the emissions threshold catalytic brick 302 in a exhaust gas circulation oven, such as a retort chamber 300, immediately after an oven-aging and chemical aging process wherein the emissions threshold catalytic brick 302 is saturated with a exhaust gas at a predetermined rate and at a predetermined temperature for a specified period of time based upon the characteristics desired for the emissions threshold catalytic brick. Additionally, a method for evaluating on-board diagnostics of an exhaust system using an emissions threshold catalytic brick 302 based upon the characteristics of the exhaust system that it will be placed in is also contemplated.

14 Claims, 5 Drawing Sheets

METHOD AND SYSTEM FOR EVALUATING EXHAUST ON-BOARD DIAGNOSTICS SYSTEM

TECHNICAL FIELD

The present invention relates generally to an exhaust system for automotive vehicles. More particularly, the present invention relates to simulating real world conditions to create exhaust system components for testing on-board diagnostics system.

BACKGROUND

Emissions controls systems are generally used as a means for limiting pollutants from the exhaust gas of an internal combustion engine. These emissions control systems limit, among other things, carbon monoxide (CO), hydrocarbon (HC), and nitrous oxide ($NO_x$) from engine exhaust gases in a variety of methods.

As it is known in the industry, the performance of a catalytic converter, and specifically catalytic converter bricks contained therein, varies as a function of time due to conditions such as chemical and thermal breakdown. The variance in performance of a catalytic converter brick is detected in the portion of a vehicle's on-board diagnostics (OBD) systems that detects emissions and emissions variances. To evaluate and verify the performance of OBD systems, experimental exhaust systems are created to verify in a laboratory setting that an OBD system is functioning properly. To do this, aged production catalytic bricks are needed to simulate the testing conditions necessary for verifying that an OBD is working properly.

It is known in the industry that levels of tailpipe emissions (HC, CO, and $NO_x$) are typically higher in vehicles with catalytic converter bricks placed in vehicles without a mileage accumulation than with a few hundred-mile accumulation. It is thus standard practice to stabilize (normalize) these catalytic converter bricks which are to be used to evaluate an OBD system. One method to accomplish this normalization process is to pass exhaust gases through the catalytic converter brick using an engine dynamometer stand, in effect simulating a mileage accumulation period. Unfortunately, this dynamometer period is both costly and time consuming.

The normalization step is part of a typical four-stage process for creating catalytic converter bricks with specific performance characteristics that are used to evaluate OBD systems under real world conditions. The four-stage process for creating the catalytic converter brick under the current methodology includes first determining the type of catalytic converter brick that will be placed in the exhaust system based upon the characteristics of the particular exhaust system. Next, the catalytic converter brick is thermally aged to a predetermined condition. Then, the catalytic converter brick is chemically aged to a predetermined condition. Finally, the catalytic converter brick is normalized to a predetermined condition. Each step is described in more detail below.

First, the type, density and size of a catalytic converter brick in an exhaust system is determined based upon the individual characteristics of the exhaust system that it will be placed in. Second, the catalytic converter brick is thermally aged for a predetermined time at a predetermined temperature to simulate real world thermal breakdown of the catalytic converter brick at a particular location in an exhaust system. Third, the catalytic converter brick is chemically aged for a predetermined time at a predetermined concentration of chemical contaminate to simulate real world chemical breakdown of the catalytic converter brick at a particular location in an exhaust system. Finally, the catalytic converter brick is normalized by placing the catalytic converter brick in an exhaust system that is placed on an engine dynamometer stand for a predetermined amount of hours to simulate real world chemical and thermal breakdown as a result of typical mileage accumulation of a catalytic converter brick on a vehicle. This normalized catalytic converter brick will have a particular emissions characteristic (within a certain parameter) that has been previously verified when it is placed in a laboratory exhaust system. If the OBD systems is functioning properly when placed on the laboratory exhaust system, it will read a similar emissions characteristic for the normalized catalytic converter brick.

It would therefore be desirable to provide a normalized catalytic converter brick, hereinafter an emissions threshold catalytic brick, without the accompanying mileage accumulation in order to evaluate and verify the operation of OBD systems under real world conditions.

SUMMARY OF THE INVENTION

It is an object of the present invention to provide an emissions threshold catalytic brick without an accompanying mileage accumulation that may be used for testing of an OBD exhaust systems in real world situations.

The above object is achieved by providing a method of normalizing an emissions threshold catalytic brick without the need for mileage accumulation by placing the emissions threshold catalytic brick immediately after thermal and chemical aging in an exhaust gas circulating oven.

The above object is also part of an overall OBD Emissions Threshold Catalyst Process for evaluating an OBD system in a laboratory environment. The process comprises the steps of determining the location, type, size and density of an emissions threshold catalytic brick based upon the characteristics of the exhaust system in which the emissions threshold catalytic brick will be used; determining an aging time and temperature for thermal aging of the particular emissions threshold catalytic brick based upon these same characteristics; determining a chemical aging process of the particular emissions threshold catalytic brick based upon these same characteristics; normalizing the emissions threshold catalytic brick by placing it in an exhaust gas circulating oven at a particular temperature, time, and air/fuel stoichiometry based upon these same characteristics, and placing the emissions threshold catalytic brick in an experimental exhaust system with these same characteristics to verify that an OBD exhaust system is functioning properly.

Other objects and advantages of the present invention will become apparent upon considering the following detailed description and appended claims, and upon reference to the accompanying drawings.

DESCRIPTION OF THE PREFERRED EMBODIMENT(S)

Figure 1:
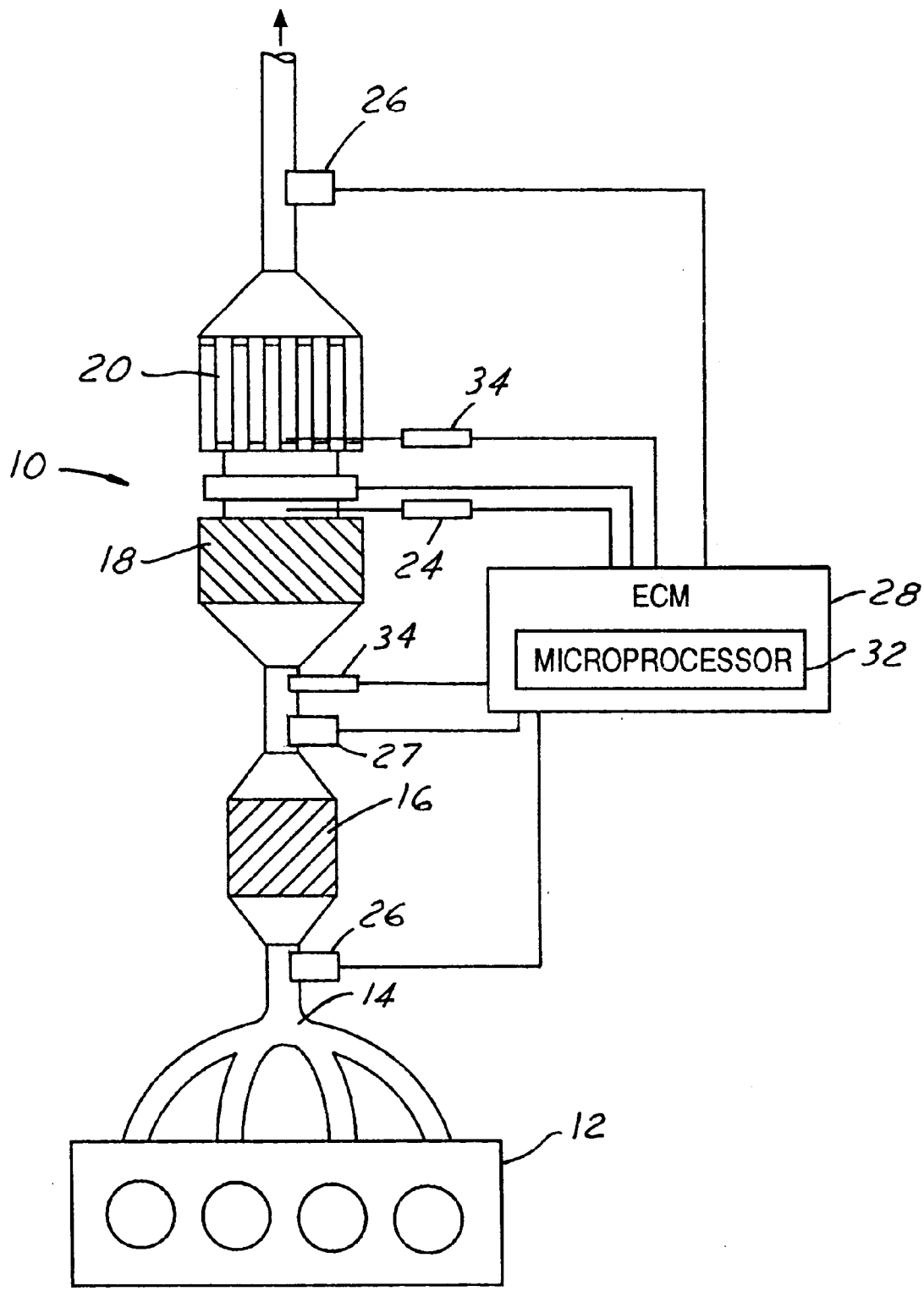
FIG. 1 is a schematic diagram of a typical exhaust system used in an internal combustion engine.

Turning now to FIG. 1, an exhaust system 10 is illustrated in operational relationship with an internal combustion engine 12. The engine 12 has an exhaust manifold 14 to direct the exhaust gases from the engine 12 to the exhaust system 10. Closely coupled to the exhaust manifold 14 is a catalytic converter brick 16, which functions to oxidize a majority of the HC and CO as well as a portion of the $NO_x$ in the exhaust flow at its operational temperature. The exhaust system 10 may further contain an HC trap 18, which captures HC from the engine 12 prior to the catalytic converter brick 16 reaching operational temperature, and a $NO_x$ trap 20, which absorbs exhaust gas $NO_x$.

The functioning of the catalytic converter brick 16, the HC trap 18 and the $NO_x$ trap 20 are controlled and monitored by the engine control module (ECM) 28. Logic control of the exhaust system 10 is controlled by the ECM 28 ideally containing a microprocessor and associated memory 32. At least one catalyst monitor sensor (CMS) 24 and at least one heated exhaust gas oxygen sensor (HEGO) 26 provide feedback to the ECM 28 corresponding to exhaust gas concentrations at various locations on the exhaust system 10. Temperature sensors 34 and oxygen sensors 27 provide feedback to the ECM 28 corresponding to exhaust gas temperatures at various locations on the exhaust system 10. The ECM 28 functions to limit emissions output of the exhaust system 10 by interpreting the data collected from the CMS 24, the HEGO 26, the oxygen sensors 27 and the temperature sensors 34 to modify or adjust various engine parameters (e.g. combustion mode, air/fuel ratio, spark, exhaust gas recirculation, gear ratio) of the internal combustion engine 12 based upon engine speed, load, vehicle speed, operating conditions (e.g. cold start, warm) and acceleration rate, among other things, as is known in the art. The ECM 24 also will modify or adjust engine parameters to account for purging cycles of the HC trap 18 and $NO_x$ trap 20 as is known in the art. Collectively, the ECM 28, CMS 24, the HEGO 26, the oxygen sensors 27 and the temperature sensors 34 comprise a portion of the OBD system 40 for a vehicle.

Figure 2:
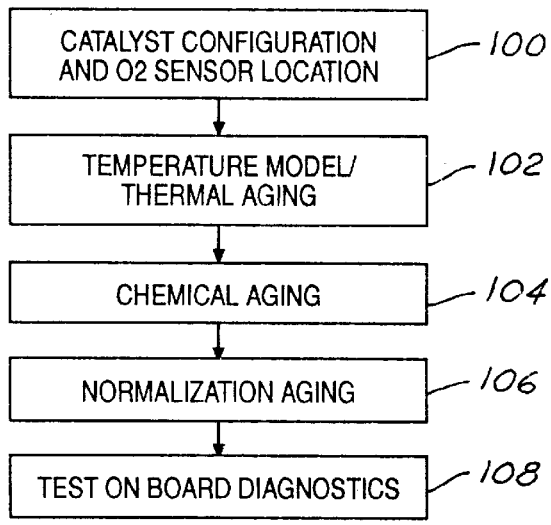
FIG. 2 is a flow chart diagram of the process of determining the ultimate characteristics of the emissions threshold catalytic brick used in exhaust systems according to a preferred embodiment of the present invention.

FIG. 2 is a flow chart for creating an ideal emissions threshold catalytic brick for testing the OBD exhaust system according to a preferred embodiment. First, the physical configuration of the exhaust system, including the location of the various catalytic converter bricks and various sensors used in the system, is determined in Step 100. The information in Step 100 includes exhaust pipe configuration (Y-shaped, standard, or other), sensor (CMS, HEGO, temperature, oxygen or other) location, catalyst brick type (COC catalyst, three way catalyst (TWC), HC trap, $NO_x$ trap, low OSC catalyst, high OSC catalysts, zoned catalyst, or another brick known in the industry), catalytic converter brick location and number, and catalytic converter brick volume (both monitored and unmonitored). Based upon this initial information, an oven-aging recipe and temperature time formulation is determined in Step 102 for an individual emissions threshold catalytic brick. The emissions threshold catalytic brick is then placed into a ceramic oven according to this recipe to thermally age the emissions threshold catalytic brick as further described below in FIG. 3.

In addition, based upon the initial information of Step 100 and the thermal aging process of Step 102, a chemical-aging process of the emission threshold catalyst brick is determined in Step 104. Here, the emissions threshold catalytic brick is dipped in a phosphoric acid (or phosphate salt) in water slurry of a predetermined concentration (ranging up to 10% by volume $P_2O_5$ in solution) for a predetermined time based upon Step 100. Portions of the emissions threshold catalytic brick may be dipped more frequently to form a gradient on the emissions threshold catalytic brick, depending upon the level of phosphorus contamination at a particular location desired. Phosphorus levels of 1–7% of total brick weight are typical for evaluation purposes, with 1–1.5% typical for a 100,000 mile real world customer catalyst systems in vehicles and higher levels (approaching 7%) likely to turn on a malfunction indicator light on a vehicle (indicating that the phosphorus contamination has inhibited the ability of catalytic converter bricks to limit emissions according to the particular emissions standards for that vehicle).

The dipped emissions threshold catalytic brick is then placed in a calcining oven to drive off water for a predetermined time at a predetermined temperature (typically around four hundred degrees Celsius). Next, again based upon the initial information of Step 100, combined with the processes of Step 102 and 104, the emissions threshold catalytic brick is normalized according to Step 106. Finally, the emissions threshold catalytic brick resulting from Steps 100 through 106 is then available in Step 108 for laboratory testing of on-board diagnostic (OBD) exhaust systems to evaluate whether the OBD is performing properly by either adjusting engine controls or warning the vehicle operator that there is an emissions problem.

Figure 3:
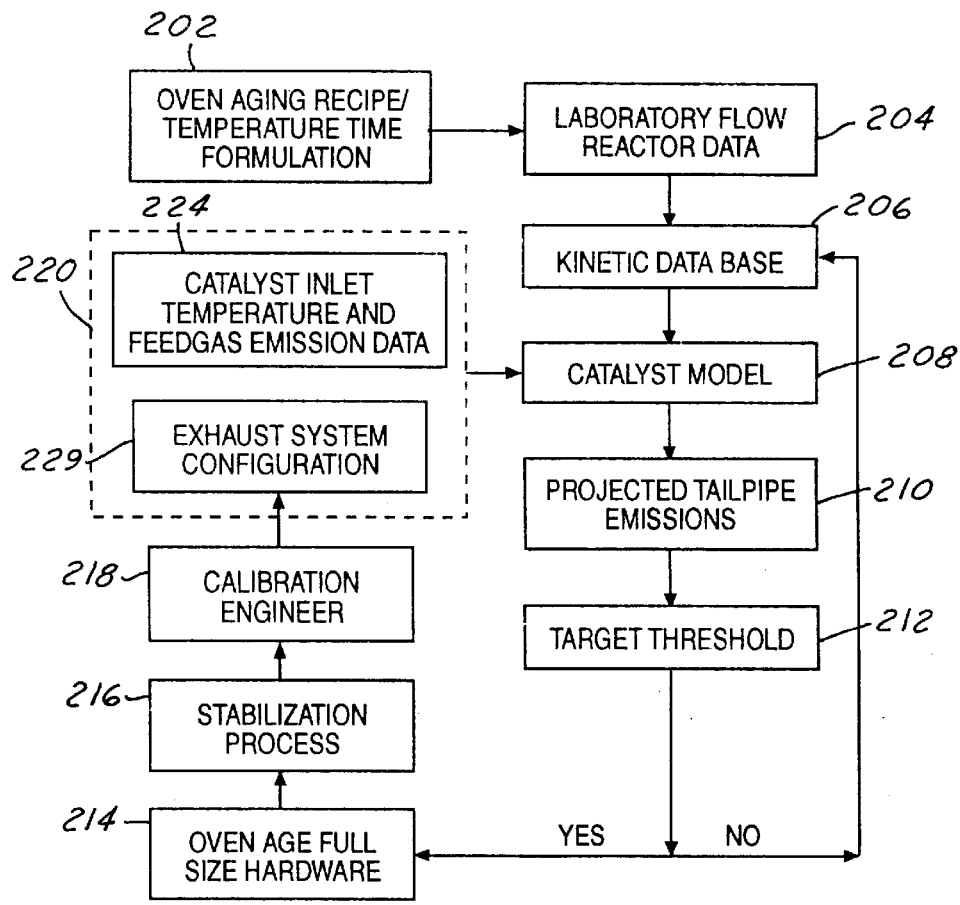
FIG. 3 is a detailed logic flow diagram of portions of FIG. 2 according to a preferred embodiment of the present invention.

FIG. 3 is a detailed logic flow diagram of portions of FIG. 2. The portions detailed in FIG. 3 represent the temperature model and thermal aging step 102 as shown in FIG. 2. The logic flow diagram of FIG. 3 illustrates the steps of aging the emissions threshold catalytic brick at a predetermined temperature and a predetermined time in a thermal aging oven based upon the size, type and location of the emissions threshold catalytic brick. For example, a typical catalytic brick used in these evaluations may be aged at 1300 degrees Celsius for 12 hours with a very short ramp up time (described as the time to get the object to the temperature desired). Similar to Step 102 of FIG. 2, Step 202 of FIG. 3 determines an oven-aging recipe and temperature/time formulation for an emissions threshold catalytic brick based upon a number of factors. A sample emissions threshold catalytic brick is then placed in a laboratory flow reactor in Step 204 to determine a kinetic rate constant for the particular emissions threshold catalytic brick. The kinetic rate constant is then incorporated into a database in Step 206 and used to produce a catalyst model in Step 208 and to project tailpipe emissions for that catalyst model in Step 210. In Step 212, the catalyst model is tested to see if the target threshold emission is met. If it is not, Step 212 indicates that the process should revert back to step 206. If it is met, Step 214 is executed. In Step 214, the full-sized emissions threshold catalytic brick should be oven-aged according to the recipe determined in Step 202. The full-sized emissions threshold catalytic brick is then stabilized in Step 216 according to the recipe. Step 218 allows for calibration of the full-sized emissions threshold catalytic brick by an engineer based upon subsequent testing results after Step 216. The full-sized emissions threshold catalytic brick is then placed in its exhaust system configuration in Step 222 and catalyst inlet temperature and feedgas emission data are determined in Step 224. The information is fed to the catalyst model in Step 208 and the process begins again to achieve the ultimate thermal aging process for each brick location, type, and size. Similarly, the same process can be used for the chemical aging process (as described above) and for a combination thermal and chemical aging process. Since most catalytic converter bricks experience thermal and chemical breakdown, most simulated bricks produced according to FIGS. 2 and 3 are both thermally and chemically aged.

Figure 4:
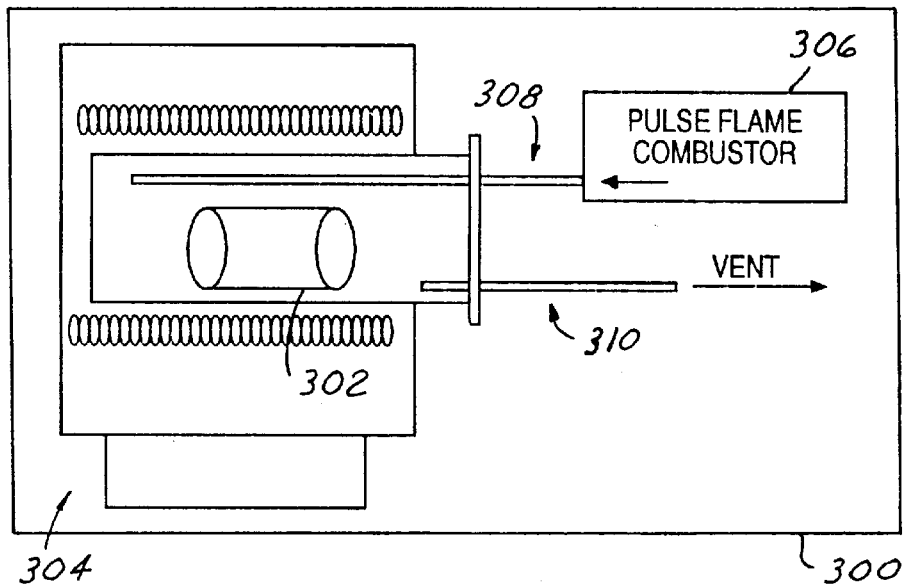
FIG. 4 is the apparatus for normalizing the emissions threshold catalytic brick in an exhaust gas circulating oven according to a preferred embodiment of the present invention.

FIG. 4 illustrates the apparatus for normalizing the emissions threshold catalytic brick 302 in an exhaust gas circulating oven, such as a retort chamber 300, according to a preferred embodiment of the present invention. In FIG. 4, the emissions threshold catalytic brick 302 is placed in a ceramic oven 304 of a retort chamber 300. A pulse flame combustor 306, acting in a similar manner to the combustion system of an internal combustion engine, delivers a exhaust gas (the exhaust gas is the product of combusting a fuel vapor previously introduced to the pulse flame combustor 306, where the fuel vapor is a mixture of air and fuel at approximately a stoichiometric ratio, or 14.6:1 air to fuel) and introduced to the ceramic oven 304 through a connector 308 at a predetermined rate. The ceramic oven 304 is heated to a predetermined level (typically around 600 degrees Celsius) and the emissions threshold catalytic brick 302 remains in the ceramic oven 304 for a predetermined time (typically 2–12 hours). The rate, level, and time are a function of the location and size of the emissions threshold catalytic brick 302 needed for a particular system as determined in Step 100 above. The exhaust gas is vented from the ceramic oven 304 through a vent 310. The emissions threshold catalytic brick 302 is removed from the ceramic oven 304 at the completion of the process and is available to test and verify OBD exhaust systems in a laboratory exhaust system.

Figure 5:
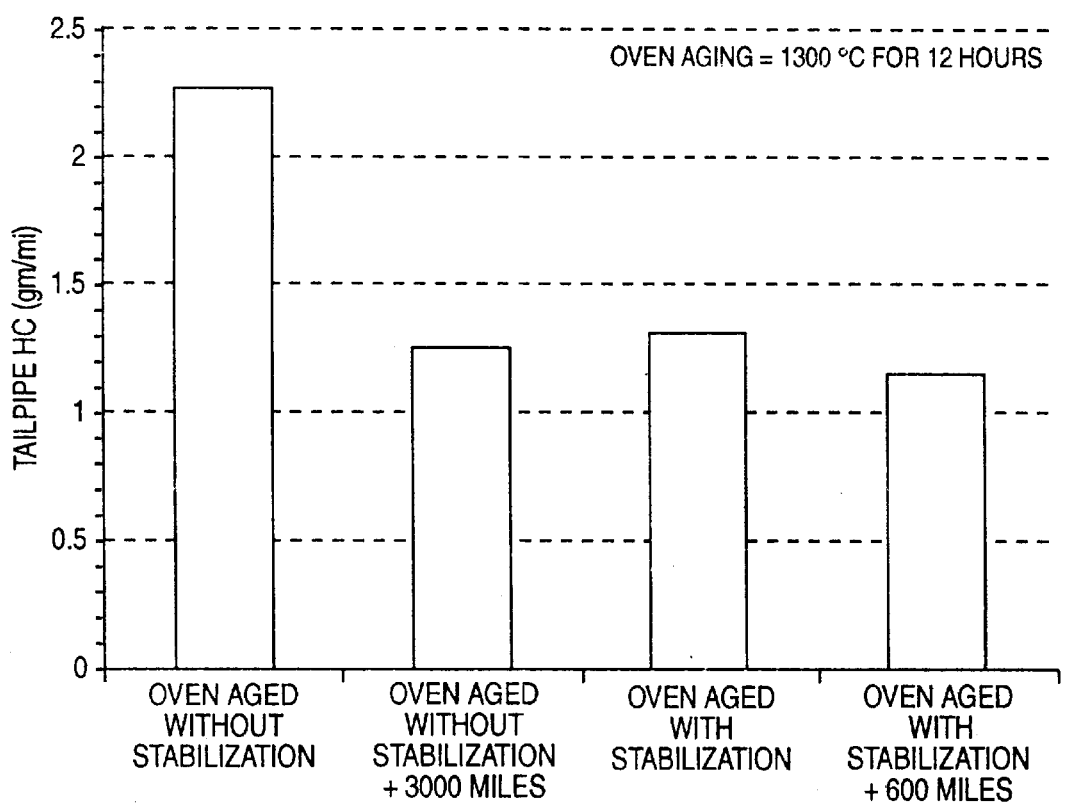
FIG. 5 is a graph showing tailpipe Hydrocarbon (HC) emissions for systems using oven-aged catalysts with and without stabilization at various accumulated mileages.
Figure 6:
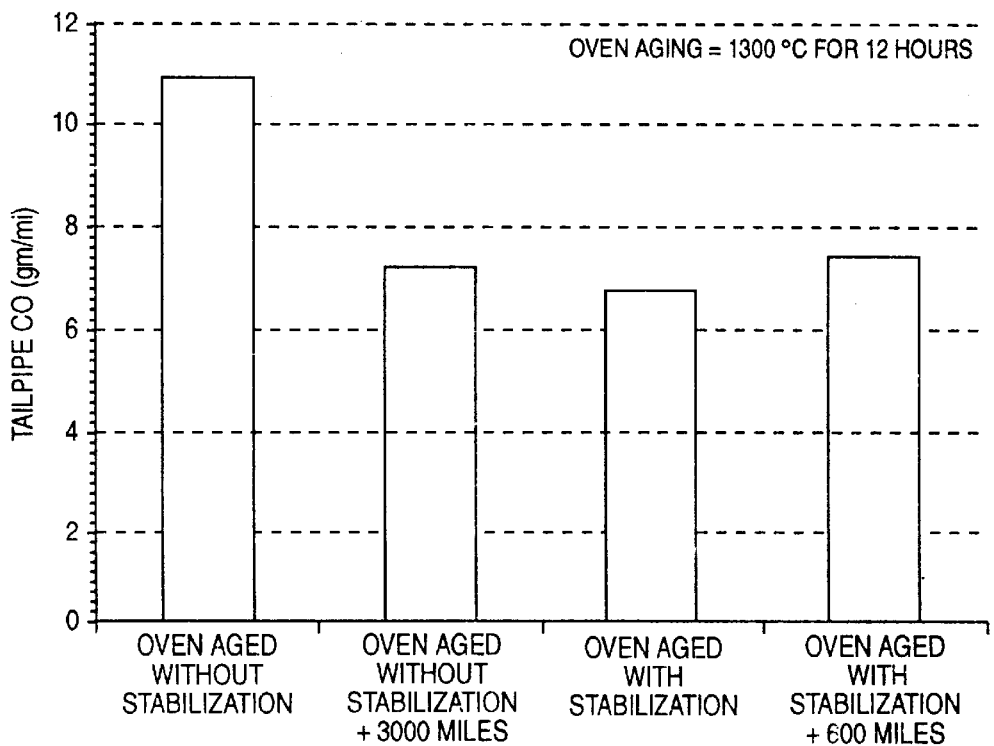
FIG. 6 is a graph showing tailpipe Carbon Monoxide (CO) emissions for systems using oven-aged catalysts with and without stabilization at various accumulated mileages.
Figure 7:
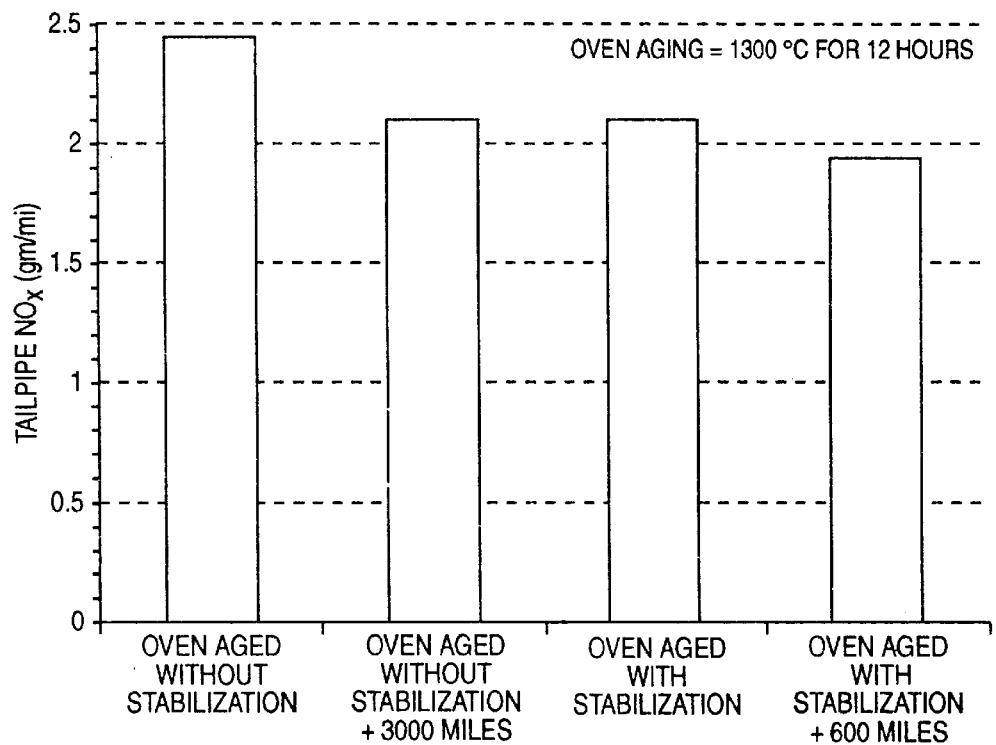
FIG. 7 is a graph showing tailpipe Nitrous Oxide ($NO_x$) emissions for systems using oven-aged catalysts with and without stabilization at various accumulated mileages.

FIGS. 5, 6, and 7 are graphs that verify that the retort stabilization process significantly decreases tailpipe emissions without mileage accumulation for a particular engine. All three graphs plot the amount of tailpipe emissions of a particular pollutant (HC, CO or $NO_x$) in grams per mile for various types of catalytic converter bricks. The catalytic converter bricks in all three figures were thermally aged for 12 hours at 1300 degrees Celsius and then normalized according to the process described above.

FIG. 5 is a graph that illustrates that the normalization process reduces tailpipe HC emission without a necessary mileage accumulation. As shown in FIG. 5, oven-aged catalytic bricks that were not stabilized and without mileage accumulation had HC tailpipe emissions of approximately 2.3 gm/mi, while stabilized emissions threshold catalytic bricks without mileage accumulation had HC tailpipe emissions of approximately 1.3 gm/mi, which corresponds to a 43% drop in HC tailpipe emissions. This compares favorably to an oven-aged brick without stabilization with 3000 miles, which had HC tailpipe emissions of approximately 1.2 gm/mi. FIG. 5 further shows that the stabilized emissions threshold catalytic bricks HC tailpipe emissions dropped to approximately 1.1 gm/mi after 600 miles.

Similar results are shown in FIG. 6 with CO emissions. Oven-aged catalytic bricks with stabilization and no mileage accumulation averaged drops of approximately 4.1 gm/mi from 10.9 to 6.8 g/mi, or 37.6%. This emission value compared favorably to an oven-aged brick without stabilization at 3000 miles.

Similar results are shown in FIG. 7 with $NO_x$ emissions. Oven-aged catalytic bricks with stabilization and no mileage accumulation averaged drops of approximately 0.35 gm/mi from 2.45 to 2.1 g/mi, or 14.2%. This emission value compared favorably to an oven-aged brick without stabilization at 3000 miles.

Figure 8:
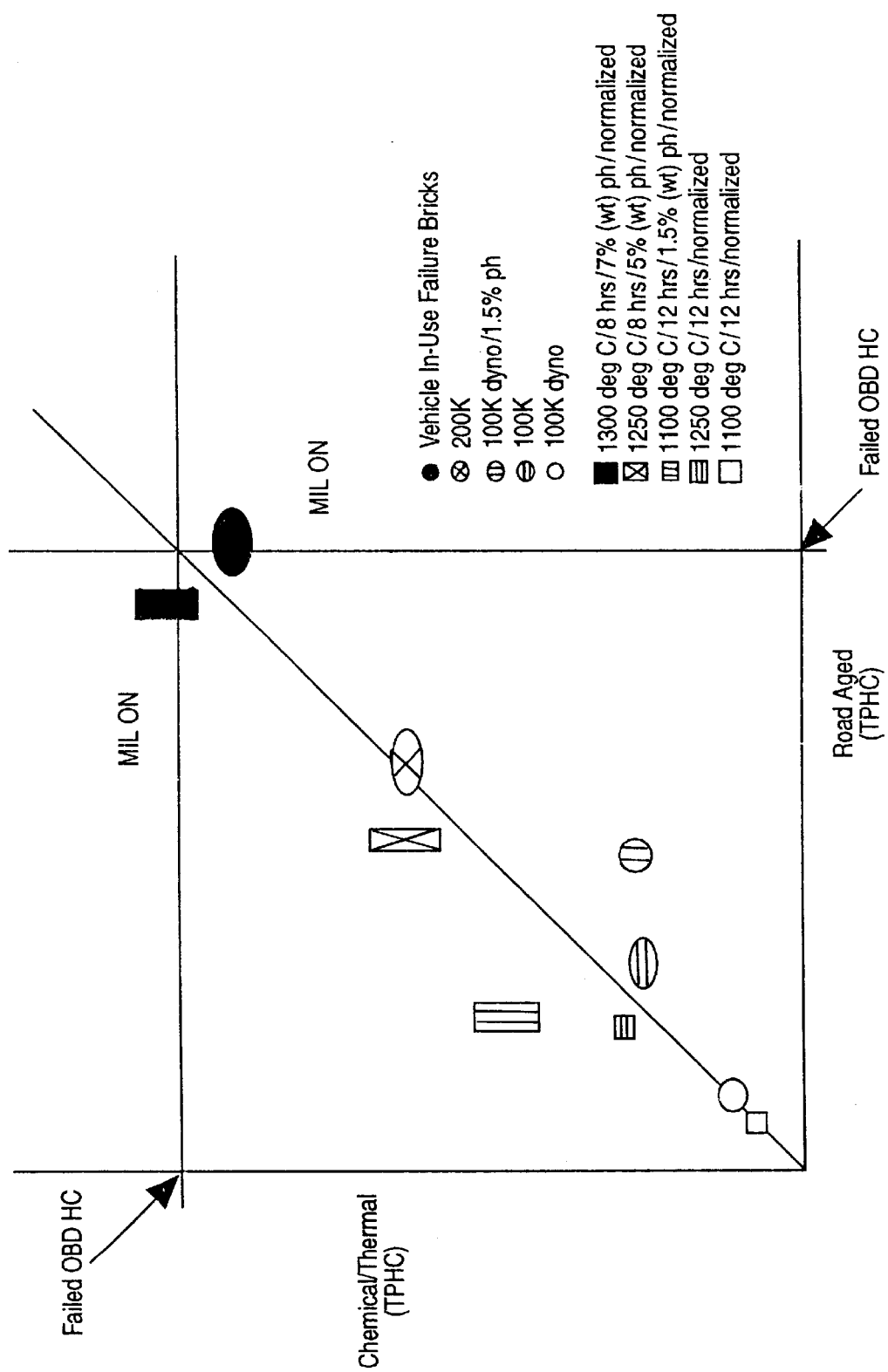
FIG. 8 is a correlation graph of HC emissions showing the performance of bricks aged according to the present invention versus actual road aged bricks.

Referring to FIG. 8, a validation graph is presented which shows a correlation in HC emissions levels between actual road aged or dynamometer aged catalytic bricks (marked with circular symbols) and catalytic bricks made according to the present invention (marked with rectangular symbols) of similar composition. Catalytic bricks were created according to the present invention of similar composition to catalytic bricks created by known techniques (100,000 mile and 200,000 mile road aged, 100,000 mile dynamometer, 100,000 mile dynamometer with 1.5% phosphorus poisoning, vehicle in-use failure bricks). These bricks were placed in experimental systems and HC emissions levels were determined. FIG. 8 shows that catalytic bricks of similar composition, whether aged according to the present invention or by known techniques, exhibited similar HC emissions levels within an area corresponding to one standard deviation level, thus validating that the bricks created according to the present invention are of similar composition.

Further validation studies (not shown) confirm the results reached in FIG. 8. CMS and HEGO sensors placed in experimental systems show that the catalytic bricks made according to the present invention exhibited similar response to real world aged bricks of similar thermal and chemical aging.

The result of the process described above in FIGS. 1 through 8 is the creation of an emissions threshold catalytic brick that has experienced real world chemical and thermal aging in a laboratory setting in a less costly manner by eliminating the need for mileage accumulation of catalytic converter bricks on a dynamometer. The normalized emission threshold catalytic brick is available to be used to evaluate the operation of OBD systems.

Thus, it is an object of the present invention to create an emissions threshold catalytic brick without a mileage accumulation normalization step and subsequently use this emissions threshold catalytic brick to evaluate an OBD exhaust system. The method of evaluating OBD systems with an emission catalytic brick comprises the steps of determining a set of characteristics of the emissions threshold catalytic brick to be used in a particular exhaust system, thermally aging the emissions threshold catalytic brick according to those characteristics, chemically aging the emissions threshold catalytic brick according to those characteristics, normalizing the emissions threshold catalytic brick in an exhaust gas circulating oven according to those characteristics, and evaluating an OBD system by placing the emissions threshold catalytic brick in a laboratory exhaust system to insure that the OBD system is functioning within the specified guidelines.

While the invention has been described in terms of preferred embodiments, it will be understood, of course, that the invention is not limited to those embodiments. On the contrary, the invention covers all alternatives, modifications, and equivalents as may be included within the true spirit and scope of the appended claims.

What is claimed is:

1. A method of evaluating an on-board diagnostics system by using an emissions threshold catalytic brick in a laboratory exhaust system, the method comprising the steps of:

determining a set of characteristics of the emissions threshold catalytic brick to be used in the laboratory exhaust system;

thermally aging the emissions threshold catalytic brick;

chemically aging the emissions threshold catalytic brick;

normalizing the emissions threshold catalytic brick in an exhaust gas circulating oven;

placing said emissions threshold catalytic brick in an exhaust system having the on-board diagnostics system to be evaluated;

determining a set of values for the on-board diagnostics system in the laboratory exhaust system with said emissions threshold catalytic brick; and comparing said set of values with a set of known values to determine whether said on-board diagnostics system is functioning properly.

2. A method according to claim 1, wherein the step of determining a set of characteristics comprises selecting said set of characteristics of said emissions threshold catalytic brick from a group consisting of an emissions threshold catalytic brick size, an emissions threshold catalytic brick location, an emissions threshold catalytic brick density, and an emissions threshold catalytic brick formulation.

3. A method according to claim 2, wherein the step of selecting said emissions threshold catalytic brick formulation comprises selecting said emissions threshold catalytic brick formulation from a group consisting of a COC catalyst, a three way catalyst, an HC traps, a $NO_x$ trap, a low OSC catalyst, a high OSC catalysts and a zoned catalyst.

4. A method according to claim 2, wherein the step of thermally aging, comprises placing said emissions threshold catalytic brick in a ceramic oven for a predetermined time at a predetermined temperature based upon said set of characteristics.

5. A method according to claim 2, wherein the step of chemically aging comprises depositing a phosphorus oxide coating on said emissions threshold catalytic at a predetermined concentration.

6. A method-according to claim 5, wherein the step of depositing a phosphorus oxide coating on said emissions threshold catalytic brick comprises the step of dipping said emissions threshold catalytic brick in a 10% by volume slurry of phosphoric acid in water.

7. A method according to claim 5, wherein the step of depositing a phosphorus oxide coating on said emissions threshold catalytic brick comprises the step of dipping said emissions threshold catalytic brick in a 10% by volume slurry of phosphate salt in water.

8. A method according to claim 5, wherein the step of depositing a phosphorus oxide coating on said emissions threshold catalytic brick comprises the step of depositing said phosphoric oxide coating on said emissions threshold catalytic brick at said predetermined concentration, where said predetermined concentration is between 1 and 7% of total brick weight of said emissions threshold catalytic brick.

9. A method according to claim 1, wherein the step of normalizing the emissions threshold catalytic brick in an exhaust gas circulating oven comprises:

placing the emissions threshold catalytic brick in an exhaust gas circulating oven;

introducing a quantity of exhaust gas through said exhaust gas circulating oven at a predetermined rate; and heating said exhaust gas circulating oven containing said emissions threshold catalytic brick to a predetermined temperature for a predetermined time period.

10. A method of evaluating an on-board diagnostics system for a laboratory exhaust system using an emissions threshold catalytic brick comprising the steps of:

determining a set of diagnostic standard values for the laboratory exhaust system having the emissions threshold catalytic brick and a previously calibrated on-board diagnostics system;

placing the emissions threshold catalytic brick in the laboratory exhaust system having the on-board diagnostics system to be evaluated;

determining a set of values for the on-board diagnostics;

comparing said set of values with said set of diagnostic standard values.

11. A method according to claim 10, wherein the step of determining a set of diagnostic standard values comprises determining said set of diagnostics standard values from a group consisting of an oxygen sensor value, a catalyst monitor sensor value, and a temperature sensor value.

12. A method according to claim 10, wherein the step of determining a set of values comprises determining said set of values from a group consisting of an oxygen sensor value, a catalyst monitor sensor value, and a temperature sensor value.

13. A method according to claim 11, wherein the step of determining a catalyst monitor sensor value comprises selecting a catalyst monitor sensor value being selected from a group consisting of a hydrocarbon emission sensor value, a carbon monoxide emission sensor value, and a nitrous oxide emission sensor value.

14. A method according to claim 12, wherein the step of determining a catalyst monitor sensor value comprises selecting a catalyst monitor sensor value being selected from a group consisting of a hydrocarbon emission sensor value, a carbon monoxide emission sensor value, and a nitrous oxide emission sensor value.

* * * * *